(12) United States Patent
Che et al.

(10) Patent No.: US 11,907,057 B2
(45) Date of Patent: Feb. 20, 2024

(54) FAULT PROCESSING METHOD AND SYSTEM

(71) Applicant: Siemens Ltd., China, Beijing (CN)

(72) Inventors: Xiao Yin Che, Beijing (CN); Hao Tian Hui, Suzhou (CN); Jiao Jian Wang, Nanjing (CN); Ruo Gu Sheng, Beijing (CN); Daniel Schneegaß, Beijing (CN)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 17/769,778

(22) PCT Filed: Oct. 16, 2019

(86) PCT No.: PCT/CN2019/111520
§ 371 (c)(1),
(2) Date: Apr. 18, 2022

(87) PCT Pub. No.: WO2021/072687
PCT Pub. Date: Apr. 22, 2021

(65) Prior Publication Data
US 2022/0374300 A1    Nov. 24, 2022

(51) Int. Cl.
*G06F 11/07* (2006.01)
(52) U.S. Cl.
CPC .......... *G06F 11/079* (2013.01); *G06F 11/076* (2013.01)
(58) Field of Classification Search
CPC .............................. G06F 11/079; G06F 11/076
See application file for complete search history.

(56) References Cited

U.S. PATENT DOCUMENTS

| 2011/0314332 A1 | 12/2011 | Shimada .......................... 714/26 |
| 2016/0196501 A1 | 7/2016 | Anand et al. ................... 706/46 |

(Continued)

FOREIGN PATENT DOCUMENTS

| CN | 102765643 | 11/2012 | ............... B66B 5/02 |
| CN | 103135014 | 6/2013 | ............. G01R 31/00 |

(Continued)

OTHER PUBLICATIONS

Search Report for International Application No. PCT/CN2019/111520, 12 pages, dated Jul. 16, 2020.

(Continued)

*Primary Examiner* — Jigar P Patel
(74) *Attorney, Agent, or Firm* — Slayden Grubert Beard PLLC (57) ABSTRACT

Various embodiments of the teachings herein include a fault processing method comprising: receiving two historical faults similar to a target fault; searching keywords in a description of the target fault and each historical fault, wherein the keywords are classified into N grades, and for each system component in a grade, the grade comprises at least one keyword for describing the component, wherein N is an integer no less than 2; for each of the N grades, counting a quantity of identical system components represented by the keywords in the text description of each historical fault and the target fault; and comparing a degree of similarity of each historical fault to the target fault according to the quantity of identical system components counted in each grade of the N different grades, wherein a historical fault relating to a larger number of high-grade identical system components has a higher degree of similarity to the target fault.

9 Claims, 5 Drawing Sheets

(56) References Cited

U.S. PATENT DOCUMENTS

| | | | |
|---|---|---|---|
| 2017/0068721 A1 | 3/2017 | Chafle et al. | 707/738 |
| 2018/0083995 A1* | 3/2018 | Sheth | G06F 16/958 |
| 2019/0199759 A1* | 6/2019 | Anderson | G06Q 50/20 |
| 2020/0151276 A1* | 5/2020 | Rodrigues De Oliveira | G06F 16/381 |

FOREIGN PATENT DOCUMENTS

| | | | |
|---|---|---|---|
| CN | 110297841 | 10/2019 | G06F 16/242 |
| JP | 2012 003497 | 1/2012 | G06Q 50/10 |

OTHER PUBLICATIONS

Extended European Search Report, Application No. 19948976.6, 9 pages, dated May 16, 2023.

* cited by examiner

FAULT PROCESSING METHOD AND SYSTEM

CROSS-REFERENCE TO RELATED APPLICATIONS

This application is a U.S. National Stage Application of International Application No. PCT/CN2019/111520 filed Oct. 16, 2019, which designates the United States of America, the contents of which are hereby incorporated by reference in their entirety.

TECHNICAL FIELD

The present disclosure relates to natural language processing (NLP) technology. Various embodiments of the teachings herein include fault processing methods and/or systems.

BACKGROUND

Various faults happen in various processing procedures such as industrial production procedure. When a new fault happens, how to quickly find a solution is a widely concerned problem. A well-operated industrial production organization, for example, a factory, will record and file faults happening before in an industrial production procedure, for example, and typically, will use texts to describe fault phenomena, fault causes and/or fault solutions. Faults are managed in a way of fault cases. When a new fault happens, the new fault will be compared with recorded historical faults and a list of similar historical faults will be found to provide a reference fault solution. Here, the system performing the above-mentioned fault analysis is called fault case retrieval system.

Faults are usually described in texts, and therefore, the NLP method is widely used to compare a new fault with historical faults. However, some NLP-based fault case retrieval systems usually return historical faults which are similar in the language description but not closely correlated in the actual technology. For example, among faults A, B and C in Table 1 below, fault A is a new fault, and faults B and C are historical faults.

TABLE 1

| Fault ID | Fault description |
|---|---|
| A | Part 1 of device A vibrates abnormally and makes some noise. |
| B | Part 1 of device B vibrates abnormally and makes much noise. |
| C | A worker finds that a part of device A may work abnormally and abnormal noise can be heard. After a check, the cause is a fault of part 1. |

Fault C and fault A describe the same type of faults. However, the NLP-based fault case retrieval system will usually consider fault B is more similar. This is because fault B and fault A have more identical continuous characters or n-grams, which are the common basic feature in the NLP-based method. In other words, fault B is more similar to fault A in the language description. However, the customer needs to first consider the correlation in the actual technology, instead of the similarity in the language description when retrieving faults.

SUMMARY

The teachings of the present disclosure address inaccurate fault retrieval results caused when only the similarity in the language description is considered in an NLP-based fault case retrieval system. Various embodiments of the teachings herein include fault processing methods and/or systems. By predefining some keywords to determine faults correlated in the actual technology and considering the priorities between a plurality of keywords in the determination of the similarity of faults, faults not correlated in the actual technology are effectively filtered out and the list of similar historical faults obtained is also sorted by actual technology correlation.

For example some embodiments include a fault processing method (100), characterized in that the method comprises: receiving at least two historical faults similar to a target fault (S101), searching predefined keywords in the text description of the target fault and the text description of each historical fault, respectively (S102), wherein the predefined keywords are classified into N different grades, and for each of at least one system component in a grade, the grade comprises at least one keyword for describing the system component, wherein N is an integer no less than 2, for each of the N different grades, counting the number of identical system components represented by the keywords in the grade in the text description of each historical fault and the keywords in the grade in the text description of the target fault, respectively (S103), and comparing the degree of similarity of each historical fault to the target fault according to the number of identical system components counted in each grade of the N different grades (S104), wherein a historical fault relating to a larger number of high-grade identical system components has a higher degree of similarity to the target fault.

In some embodiments, the at least two historical faults are obtained by a fault case retrieval system.

In some embodiments, the method further comprises removing historical faults from the at least two historical faults if the number of identical system components related to the historical faults is 0 for each of the N different grades (S105).

In some embodiments, N is determined by the number of layers of the system composition of the target system related to the target fault, and the larger the number of layers of the system composition of the target system is, the larger N is.

In some embodiments, a system comprises: a receiving module (101), configured to receive at least two historical faults similar to a target fault, a searching module (102), configured to search predefined keywords in the text description of the target fault and the text description of each historical fault, respectively, wherein the predefined keywords are classified into N different grades, and for each of preset at least one system component in a grade, the grade comprises at least one keyword for describing the system component, wherein N is an integer no less than 2, a counting module (103), configured to count the number of identical system components represented by the keywords in the grade in the text description of each historical fault and the keywords in the grade in the text description of the target fault respectively for each of N different grades, and a processing module (104), configured to compare the degree of similarity of each historical fault to the target fault according to the number of identical system components counted in each grade of the N different grades, wherein a historical fault relating to a larger number of high-grade identical system components has a higher degree of similarity to the target fault.

In some embodiments, the at least two historical faults are obtained by a fault case retrieval system (20).

In some embodiments, the processing module (104) is further configured to remove historical faults from the at least two historical faults if the number of identical system components related to the historical faults is 0 for each of the N different grades.

In some embodiments, N is determined by the number of layers of the system composition of the target system related to the target fault, and the larger the number of layers of the system composition of the target system is, the larger N is.

As another example, some embodiments include a fault processing system (10), characterized in that the fault processing system comprises: a processor (106), and a memory (105), connected to the processor (106) and configured to store computer-executable instructions, the computer-executable instructions allowing the at least one processor (106) to execute one or more of the methods described herein when executed.

As another example, some embodiments include a computer-readable medium, executable instructions being stored in the computer-readable medium, the executable instructions allowing a processor to execute one or more of the methods described herein when executed by the processor.

BRIEF DESCRIPTION OF THE DRAWINGS

By reference to the description of the embodiments of the teachings herein in combination with the drawings, the above-mentioned attributes and other features, advantages, and implementation modes will be more obvious, and in addition, the teachings of the present disclosure will be better understood.

In the drawings.

DETAILED DESCRIPTION

In some embodiments of the teachings herein, a fault processing method comprises: receiving at least two historical faults similar to a target fault; searching predefined keywords in the text description of the target fault and the text description of each historical fault, respectively, wherein the predefined keywords are classified into N different grades, and for each of at least one system component in a grade, the grade comprises at least one keyword for describing the system component, wherein N is an integer no less than 2; for each of the N different grades, counting the number of identical system components represented by the keywords in the grade in the text description of each historical fault and the keywords in the grade in the text description of the target fault, respectively; comparing the degree of similarity of each historical fault to the target fault according to the number of identical system components counted in each grade of the N different grades, wherein a historical fault relating to a larger number of high-grade identical system components has a higher degree of similarity to the target fault.

In some embodiments, a fault processing system comprises a receiving module, configured to receive at least two historical faults similar to a target fault; a searching module, configured to search predefined keywords in the text description of the target fault and the text description of each historical fault, respectively, wherein the predefined keywords are classified into N different grades, and for each of at least one system component in a grade, the grade comprises at least one keyword for describing the system component, wherein N is an integer no less than 2; a counting module, configured to count the number of identical system components represented by the keywords in the grade in the text description of each historical fault and the keywords in the grade in the text description of the target fault respectively for each of N different grades; a processing module, configured to compare the degree of similarity of each historical fault to the target fault according to the number of identical system components counted in each grade of the N different grades, wherein a historical fault relating to a larger number of high-grade identical system components has a higher degree of similarity to the target fault.

In some embodiments, a fault processing system comprises a processor and a memory, the memory is connected to the processor and is configured to store computer-executable instructions, and the computer-executable instructions allow the at least one processor to execute one or more of the methods described herein when executed.

In some embodiments, a computer-readable medium store executable instructions and the executable instructions allow a processor to execute one or more of the methods described herein when executed by the processor.

In some embodiments, for a plurality of historical faults (for example, a historical fault list output by a fault case retrieval system) already determined to be similar to a target fault in a certain way, keywords in the description of faults are searched, and when the similarity is determined, whether the keywords represent an identical system component, other than the similarity of keywords in the language description is considered. This ensures that the found faults are the faults correlated in the actual technology. In addition, in consideration of the compositional structure of a target system, keywords are classified into different grades. The layer of a system component represented by high-grade keywords is higher than the layer of a system component represented by low-grade keywords. When a plurality of historical faults are compared, a historical fault relating to a larger number of higher-layer system components has a higher degree of similarity to the target fault. In this way, the target fault relating to a plurality of system components can be analyzed effectively.

In some embodiments, the at least two historical faults are obtained by a fault case retrieval system. On the basis of a historical fault list obtained by the fault case retrieval system, historical faults are further analyzed and historical faults correlated to the target fault in the actual technology are found. Thus, the retrieval result of faults is further optimized.

In some embodiments, historical faults are further removed from the at least two historical faults if the number of identical system components related to the historical faults is 0 for each of the N different grades. In this way, historical faults which are similar in the language description but not correlated in the actual technology can be filtered out effectively.

In some embodiments, N is determined by the number of layers of the system composition of the target system related to the target fault, and the larger the number of layers of the system composition of the target system is, the larger N is. Setting N according to the number of layers of the system composition of the target system can ensure that N is reasonable and that the correlations between different historical faults and the target fault can be precisely distinguished.

DESCRIPTION OF REFERENCE SIGNS IN THE DRAWINGS

100: Fault processing method
S101-S105: Steps of the method
10: Fault processing system
20: Fault case retrieval system
101-107: Components of the fault processing system 10, wherein
101: Receiving module, 102: searching module, 103: counting module, 104: processing module
105: Memory, 106: processor, 107: communication module
30: Historical fault base
40: Target fault
50: Historical fault list
60: List of re-sorted historical faults, with uncorrelated historical faults removed
70: Keyword library
80: Grade search table
90: Domain expert or third-party tool Various example embodiments are described by reference to the drawings, in which the same reference sign throughout the document is used to represent the same element. For the purpose of explanation, numerous details are expounded in the following description so as to provide a thorough understanding of one or more embodiments. It should be noted that the described embodiments are intended to explain the teachings of the present disclosure, but are not intended to restrict the scope thereof. Obviously, such embodiments can be put into practice without these details.

When the elements in various embodiments of the present disclosure are described, the articles "a" and "the" means that one or more of the elements exist. The terms "comprise", "contain" and "have" are expected to be inclusive and mean that additional elements may exist besides the listed elements.

As mentioned before, in an NLP-based fault case retrieval system, the degree of similarity of historical faults to a target fault is often determined according to the similarity in the language description. This may lead to inaccurate fault retrieval results. In the embodiments of the present disclosure, for a plurality of historical faults (for example, a historical fault list output by a fault case retrieval system) already determined to be similar to a target fault in a certain way, keywords in the description of faults are searched, and when the similarity is determined, whether the keywords represent an identical system component, other than the similarity of keywords in the language description is considered. This ensures that the found faults are the faults correlated in the actual technology.

In addition, when a target fault relates to a plurality of system components, especially when subordination relationships exist between the related system components, the analysis of the fault will be more complicated. In consideration of the compositional structure of a target system, keywords are classified into different grades. The layer of a system component represented by high-grade keywords is higher than the layer of a system component represented by low-grade keywords. When a plurality of historical faults are compared, a historical fault relating to a larger number of higher-layer system components has a higher degree of similarity to the target fault. In this way, the target fault relating to a plurality of system components can be analyzed effectively.

In some embodiments, historical faults are removed if the number of identical system components related to the historical faults is 0 for each of the different grades. In this way, historical faults which are similar in the language description but not correlated in the actual technology can be filtered out effectively.

Figure 1:
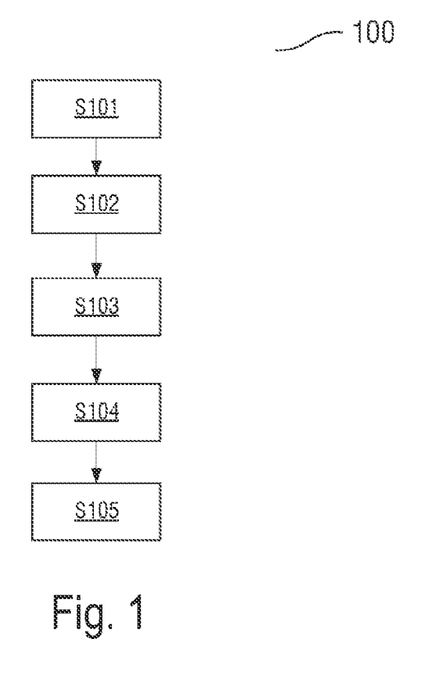
FIG. 1 is a flowchart of a fault processing method incorporating teachings of the present disclosure.

FIG. 1 is a flowchart of a fault processing method incorporating teachings of the present disclosure. As shown in FIG. 1, the method 100 comprises the following steps:

S101: Receive at least two historical faults similar to a target fault. The target fault may be a new fault happening to a target system, and the new fault may be analyzed by reference to historical faults. The target system may be a factory, for example, a power plant, or the target system may be a fueling system in a power plant, for example, or the target system may be a numerical control machine, for example.

The target fault and historical faults may happen to a target system, or happen to different target systems having the same or similar system structures and similar production procedures. For example, a new target fault happens to power plant A, and the new target fault may be analyzed by reference to historical faults happening to power plant B before. The at least two historical faults may be the results obtained after a fault case retrieval system makes retrievals for the target fault or may be the results obtained in other ways.

S102: Search predefined keywords in the text description of the target fault and the text description of each historical fault, respectively, wherein the predefined keywords are classified into N different grades, and for each of at least one system component in a grade, the grade comprises at least one keyword for describing the system component, wherein a high-grade system component comprises low-grade system components in the system composition and N is an integer no less than 2. A target system, for example, an induced fan, may comprise a motor, bearings, bearing caps and bearing ends in the system composition. A motor may comprise a plurality of bearings and a bearing may further comprise a plurality of bearing caps and a plurality of bearing ends in the system structure. Here, a high-grade system component comprises low-grade system components in the system composition, the motor is in the highest grade, the bearings are in the second grade, the bearing caps and the bearing ends are in the lowest grade.

Figure 2:
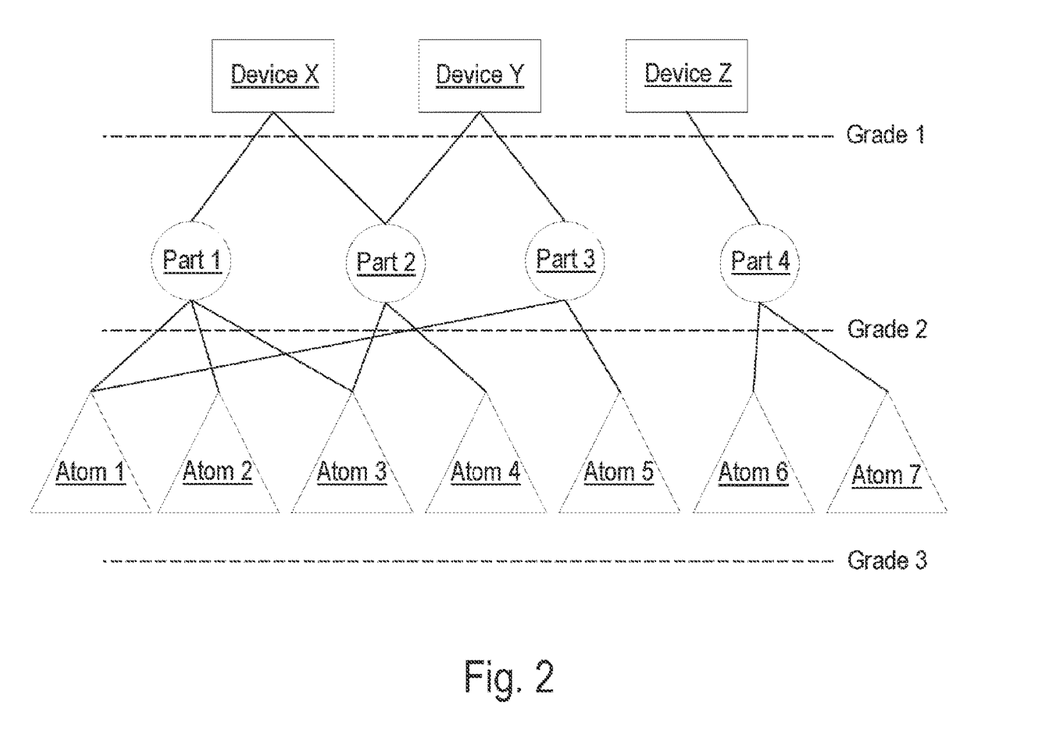
FIG. 2 shows the grades of system components in various embodiments of the present disclosure.

To describe more clearly the grades and the inclusion relationships of system components, an example, where N=3, and the target system comprises devices, parts and atoms, is given. See FIG. 2. As shown in FIG. 2, the target system comprises device X, device Y, and device Z; device X comprises part 1 and part 2, device Y comprises part 2 and part 3, and device Z comprises part 4; part 1 comprises atom 1, atom 2 and atom 3, part 2 comprises atom 3 and atom 4, part 3 comprises atom 5 and atom 1, and part 4 comprises atom 6 and atom 7. Wherein, device X, device Y and device Z are in the highest grade, namely, grade 1, part 1, part 2, part 3 and part 4 are in the second grade, and atom 1 to atom 7 are in the lowest grade, namely, grade 3.

Here, it should be noted that if the types, the functions and the structures of the same type of system components, for example, the motor in an induced fan and the motor in a blower, are the same, the motors can be considered as the same device, and if the types, the functions and the structures of different bearings comprised in the motor in the induced fan are the same, the bearings can be considered as the same device. Therefore, the inclusion relationships shown in FIG. 2 and the "system structure" mentioned in the embodiments of the present invention are logical relationships, instead of specific connection relationships, between system components.

Different keywords may be used in the text description of the same system component. In the embodiments of the present invention, different keywords representing the same system component are predefined. Thus, when these keywords are found in the text description of faults, they surely refer to the same system component.

Keywords may be classified into grades in at least two different ways:

Way 1. Define the grade of the keyword representing each system component according to the inclusion relationship between system components in FIG. 2. If the represented system component is in grade 1, then the corresponding keyword is in grade 1, and if the represented system component is in grade 2, then the corresponding keyword is in grade 2, and so on.

Way 2. Determine the system components represented by different keywords and the grades of different system components, and then determine the grades of different keywords. Example 1 below is an example of way 2.

S103: For each of N different grades, count the number of identical system components represented by the keywords in the grade in the text description of each historical fault and the keywords in the grade in the text description of the target fault, respectively. For example, four historical faults, which are historical fault 1, historical fault 2, historical fault 3 and historical fault 4, respectively, relate to the grade structure shown in FIG. 2. The text description of a target fault contains the keywords of device X, device Y, device Z, part 1 and atom 1, the text description of historical fault 1 contains the keywords of device X and part 1, the text description of historical fault 2 contains the keywords of device Y and device Z, the text description of historical fault 3 contains the keywords of device Y and atom 1, and the text description of historical fault 4 contains the keywords of device W and part 2.

Then, for grade 1, the identical system components represented by the keywords contained in the text description of historical fault 1 and the keywords contained in the text description of the target fault include device X and the number of the identical system components is 1, the identical system components represented by the keywords contained in the text description of historical fault 2 and the keywords contained in the text description of the target fault include device Y and device Z and the number of the identical system components is 2, the number of identical system components is 1 for historical fault 3, and the number of identical system components is 0 for historical fault 4.

For grade 2, the identical system components represented by the keywords contained in the text description of historical fault 1 and the keywords in the text description of the target fault include part 1 and the number of the identical system components is 1, the number of identical system components represented by the keywords contained in the text description of historical fault 2 and the keywords contained in the text description of the target fault is 0, the number of identical system components represented by the keywords contained in the text description of historical fault 3 and the keywords contained in the text description of the target fault is 0, and the number of identical system components represented by the keywords contained in the text description of historical fault 4 and the keywords contained in the text description of the target fault is 0.

For grade 3, the numbers of identical system components represented by the keywords contained in the text description of historical faults 1, 2 and 4 and the keywords contained in the text description of the target fault are all 0, and the identical system components represented by the keywords contained in the text description of historical fault 3 and the keywords contained in the text description of the target fault include atom 1 and the number of the identical system components is 1.

Table 2 shows the statistics of the numbers of identical system components for the above-mentioned three grades.

TABLE 2

| Number of identical system components | Historical fault 1 | Historical fault 2 | Historical fault 3 | Historical fault 4 |
|---|---|---|---|---|
| Grade 1 | 1 | 2 | 1 | 0 |
| Grade 2 | 1 | 0 | 0 | 0 |
| Grade 3 | 0 | 0 | 1 | 0 |

S104: Compare the degree of similarity of each historical fault to the target fault according to the number of identical system components counted in each grade of the N different grades, wherein a historical fault relating to a larger number of high-grade identical system components has a higher degree of similarity to the target fault. Historical faults listed in Table 2 are sorted in a descending order of the degree of similarity as follows:

Historical fault 2
Historical fault 1
Historical fault 3
Historical fault 4

S105: Remove historical faults from the at least two historical faults if the number of identical system components related to the historical faults is 0 for each of N different grades. The purpose of Step 105 is to avoid presenting historical faults which are not correlated to the target fault in the actual technology to the customer. Historical fault 4 is removed from the historical faults listed in Table 2. In the above-mentioned procedure, the number N of grades is determined by the number of layers of the system composition of the target system related to the target fault, and the larger the number of layers of the system composition of the target system is, the larger N is.

Figure 3:
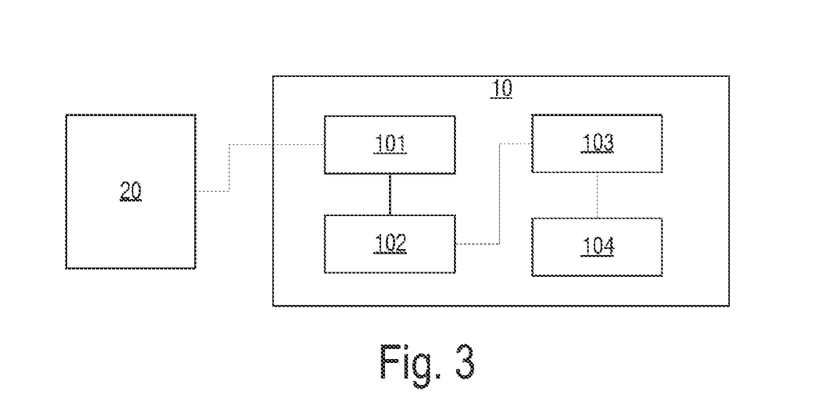
FIG. 3 is a schematic diagram of one structure of a fault processing system incorporating teachings of the present disclosure.

FIG. 3 is a schematic diagram of one structure of the fault processing system provided by the embodiments of the present invention. As shown in FIG. 3, the fault processing system 10 may comprise: a receiving module 101, configured to receive at least two historical faults similar to a target fault; a searching module 102, configured to search predefined keywords in the text description of the target fault and the text description of each historical fault, respectively, wherein the predefined keywords are classified into N different grades, and for each of at least one system component in a grade, the grade comprises at least one keyword for describing the system component, wherein a high-grade system component comprises low-grade system components in the system composition and N is an integer no less than 2; a counting module 103, configured to count the number of identical system components represented by the keywords in the grade in the text description of each historical fault and the keywords in the grade in the text description of the target fault respectively for each of N different grades;

a processing module 104, configured to compare the degree of similarity of each historical fault to the target fault according to the number of identical system components counted in each grade of N different grades, wherein a historical fault relating to a larger number of high-grade identical system components has a higher degree of similarity to a target fault.

In some embodiments, at least two historical faults are obtained by a fault case retrieval system 20.

In some embodiments, the processing module 104 is further configured to remove historical faults from at least two historical faults if the number of identical system components related to the historical faults is 0 for each of N different grades.

In some embodiments, N is determined by the number of layers of the system composition of the target system related to the target fault, and the larger the number of layers of the system composition of the target system is, the larger N is.

Figure 4:
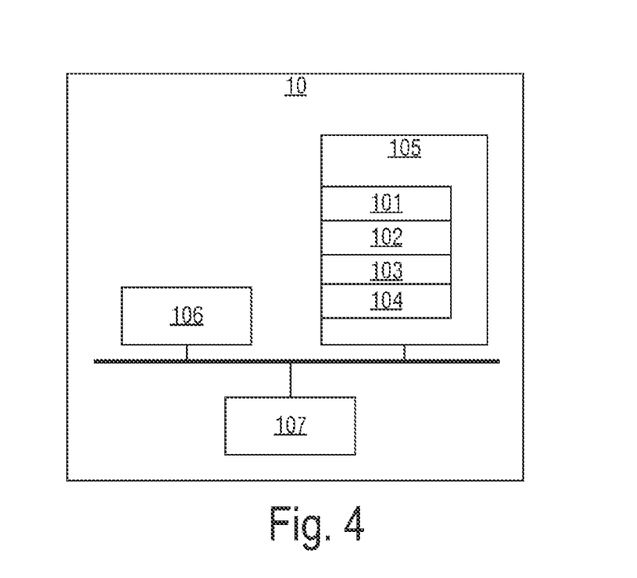
FIG. 4 is a schematic diagram of another structure of a fault processing system incorporating teachings of the present disclosure.

FIG. 4 is a schematic diagram of another structure of a fault processing system incorporating teachings of the present disclosure. As shown in FIG. 4, the fault processing system 10 may comprise: a processor 106, and a memory 105, connected to the processor 106 and configured to store computer-executable instructions, the computer-executable instructions allowing the at least one processor 106 to execute the fault processing method 100 provided by the embodiments of the present invention when executed.

In some embodiments, the fault processing system 10 may further comprise a communication module 107 and the communication module is configured to receive historical faults from a fault case retrieval system 20. In some embodiments, the processor 106, the memory 105 and the communication module 107 may be connected via a bus or may be directly connected to each other.

In some embodiments, modules 101 to 104 may be software modules comprising instructions, and the instructions are stored in the memory 105 and execute the method 100 when executed by the processor 106.

In some embodiments, a computer-readable medium stores executable instructions allowing a computer to execute the methods described herein when executed by the computer.

Example 1

Figure 5:
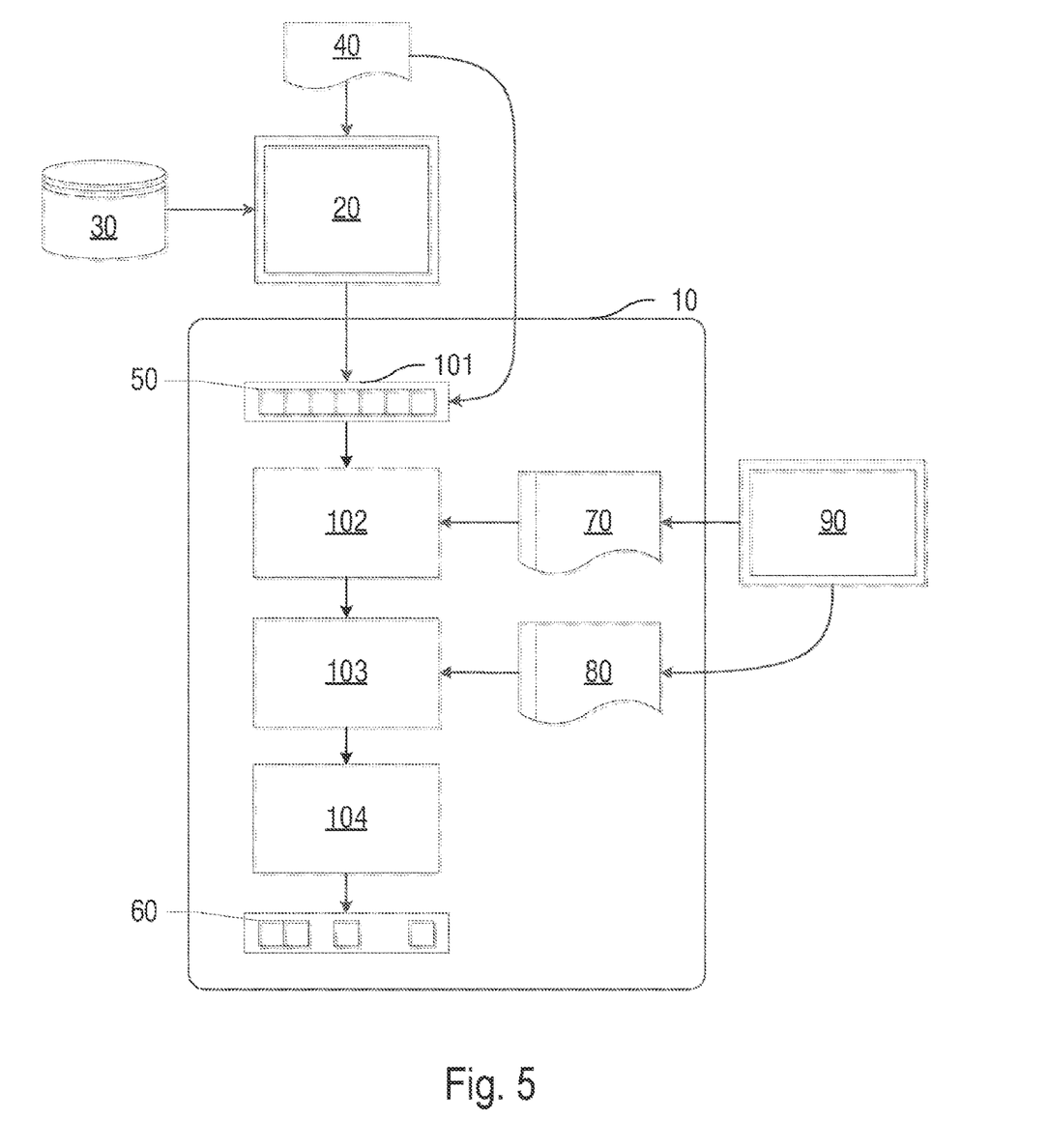
FIG. 5 shows the fault processing system provided in example 1.

As shown in FIG. 5, the fault processing system 10 receives a historical fault list 50 from the fault case retrieval system 20. The historical fault list 50 is a list of historical faults retrieved by the fault case retrieval system 20 from the historical fault base 30 and similar to a target fault 40.

After the receiving module 101 of the fault processing system 10 receives the historical fault list 50, the searching module 102 searches for keywords in the text description of historical faults and the text description of the target fault 40. Since a system component may have a plurality of text description modes, one is exemplified, wherein a system component is marked with a unique identification (UID) and the correspondence between the UID and keywords is recorded in the keyword library 70, that is to say, a system component is uniquely marked with a UID and the system component may correspond to a plurality of different keywords.

The searching module 102 analyzes the text description of the target fault 40 and the text description of historical faults based on the keyword library 70 to find predefined keywords in the keyword library 70, namely, the system component of the related target system in the text description.

The grades of different system components are predefined in the grade search table 80. A system component corresponds to a unique grade in the grade search table. The definitions of grades may be manually set by a domain expert 90, or may be automatically generated according to a complete historical fault base 30 (for example, automatically generated by a third-party tool 90). In this way, for each different grade, the counting module 103 may count the number of identical system components represented by the keywords in the grade in the text description of each historical fault and the keywords in the grade in the text description of the target fault, respectively.

The processing module 104 compares the degree of similarity of each historical fault to the target fault 40 according to the number of identical system components counted in each different grade, wherein a historical fault relating to a larger number of high-grade identical system components has a higher degree of similarity to the target fault. Further, the processing module 104 may re-sort the historical faults in the historical fault list 50 based on the determined degree of similarity.

After the number of identical system components in a grade is determined, the historical fault list 50 may be adjusted once according to the degree of similarity, and then the historical fault list may be adjusted again after the number of identical system components in a lower grade is counted; or after the number of identical components in each grade is counted, the historical fault list may be sorted according to the degree of similarity.

In the first case, an optional implementation mode comprises:

First, the keywords corresponding to the system components in the highest grade are found in the text description of the target fault 40, and then historical faults are filtered out of the historical fault list 50 by use of the system components represented by these keywords. In this way, historical faults may be divided into a plurality of grade 1 groups based on the number of identical system components related to the historical faults and the target fault 40. These groups are sorted in a descending order of the degree of similarity.

Next, the keywords corresponding to the system components in grade 2 are found in the text description of the target fault 40, then each grade 1 group is filtered by use of the system components represented by these keywords, then the plurality of grade 1 groups are further split and the sequences are adjusted to form a plurality of grade 2 subgroups, and meanwhile the sequences of grade 1 groups remain unchanged. Repeat the above process until the last grade.

Finally, historical faults having no identical system component in any grade relative to the target fault 40 are removed from the historical fault list 50. The remaining historical faults are sorted according to the re-determined degree of similarity.

In some embodiments, historical faults may be removed from the historical fault list 50 if the number of identical system components in each grade is 0. As shown in FIG. 5, historical faults 3, 5 and 6 are removed from the original historical fault list 50. The keyword library 70 and the grade search table 80 may be preset by a domain expert or a third-party tool 90.

Data related in the above-mentioned fault processing procedure may comprise:
1) Target fault 40
   Text description
2) Historical faults in the historical fault list 50
   Fault ID
   Text description
   Value of the degree of similarity, which is used to describe the degree of similarity between historical faults and the target fault 40 and may be obtained after the fault case retrieval system 20 performs calculations.
3) Keyword library 70
   Keywords, namely, text description of system components
   UIDs of system components
4) Grade search table 80
   UIDs of system components
   Grade, namely, grade of a system component Example 2

Figure 6:
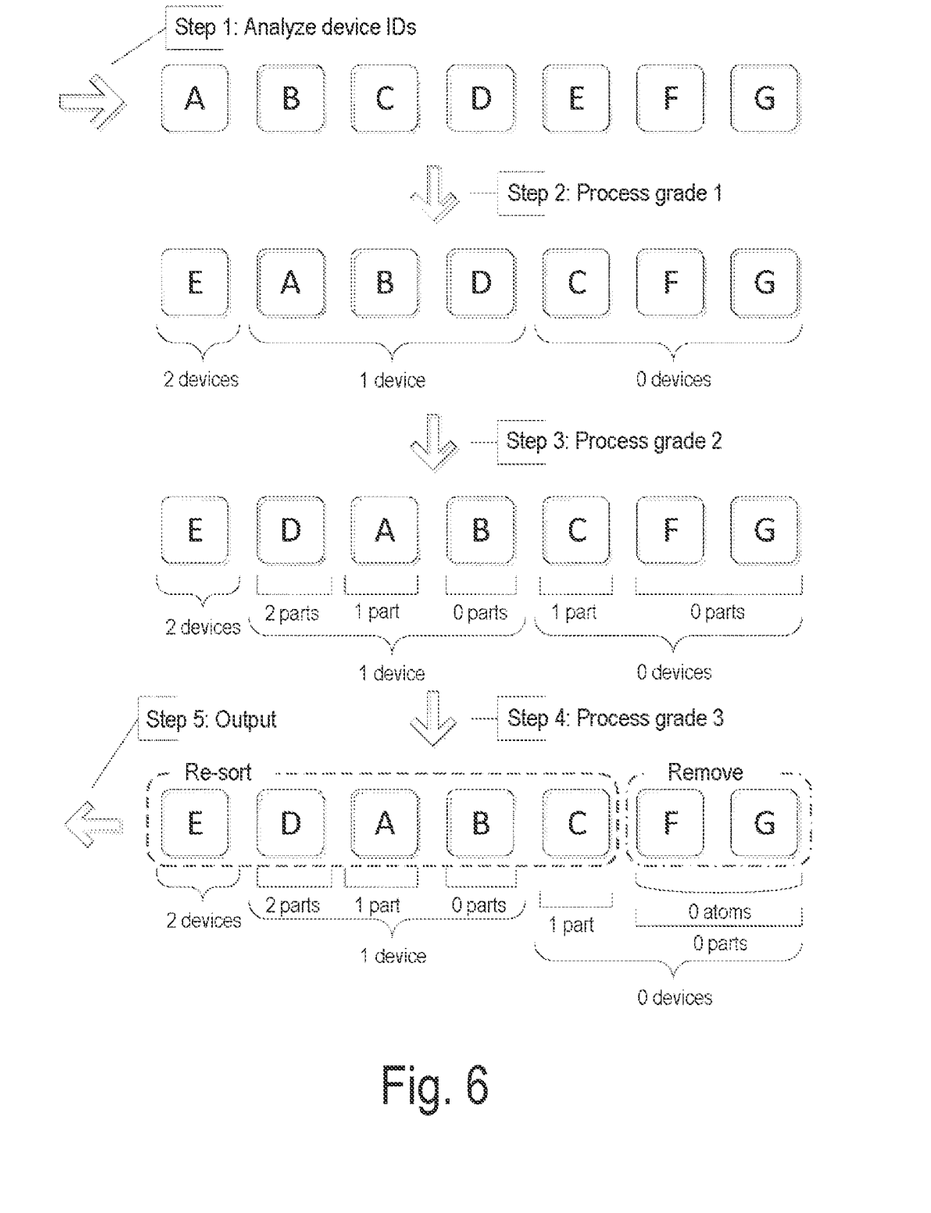
FIG. 6 shows the process of the re-sorting and filtering of searched historical faults.

As shown in FIG. 6, example 2 describes the process of the re-sorting of historical faults and the removal of dissimilar historical faults. The fault case retrieval system 20 outputs historical faults A to G as fault cases similar to new target fault I.

As shown in FIG. 6, in Step 1, the text descriptions of all faults including the target fault I and historical faults A to G are analyzed.

The grades of system components are divided as follows:
"device"—grade 1, the highest grade
"part"—grade 2
"atom"—grade 3, the lowest grade
The analytical results in step 1 are listed in Table 3.

TABLE 3

| Fault | Type | System component included | Degree of similarity |
|---|---|---|---|
| I | Target fault | Device X, device Y, part 1 and part 2 | — |
| A | Historical fault | Device X and part 1 | 0.65 |
| B | Historical fault | Device X and device Z | 0.63 |
| C | Historical fault | Part 1 and atom 1 | 0.55 |
| D | Historical fault | Device Y, part 1, part 2 and atom 2 | 0.52 |
| E | Historical fault | Device X and device Y | 0.51 |
| F | Historical fault | Device Z and atom 1 | 0.49 |
| G | Historical fault | None. | 0.21 |

Step 2. Process Grade 1
See Table 3. The historical fault E and the target fault I relate to device X and device Y, the historical faults A, B and D and the target fault I relate to only one identical device, and the other historical faults and the target fault I relate to no identical device. Therefore, the historical faults A to G are divided into 3 groups, the historical faults relating to the largest number of identical devices with the target fault I are placed at the head, historical faults relating to the smallest number of identical devices with the target fault I are placed at the end, and historical faults in a group are sorted in a descending order of the degree of similarity in Table 3.

Step 3. Process Grade 2
Only when the number of historical faults in a group exceeds 1, step 3 is required for the group of historical faults. Parts in grade 2 are used to further group historical faults. The group (A, B, D) is further divided into 3 subgroups, and the group (C, F, G) is further divided into two subgroups.

Step 4. Process Grade 3
Here, only the subgroup <F,G> needs to be further processed.

Step 5. Output
Since the historical faults F and G relate to no identical system components with the target fault I, they are removed from the historical fault list. In fact, the remaining historical faults have been re-sorted before being output. Finally, the re-sorted historical faults are output to a user interface.

In some embodiments, there is a fault processing method and/or a system used to sort and screen out a plurality of historical faults similar to a target fault preferentially according to a correlation in the actual technology, instead of a similarity in the language description, and thus, the effectiveness of an analysis of historical faults is improved. In addition, setting grade relationships between different system components of a target system with the aid of the domain knowledge makes logical and convincing the screening and re-sorting of historical faults. The solution provided is applicable to different target systems.

Although the technology of the present disclosure has been described in detail by reference to some example embodiments, it should be understood that the scope of the present disclosure is not limited to those embodiments. In fact, those skilled in the art can make various modifications and changes based on the disclosure describing the exemplary modes without departing from the scope and spirit of the present disclosure. Therefore, the scope of the present disclosure is indicated by the attached claims, instead of the previous description. All alterations, modifications and changes falling within the equivalent meaning and scope of the claims are considered falling within the scope of protection of the claims.

What is claimed is:
1. A fault processing method comprising:
   receiving two historical faults similar to a target fault;
   searching predefined keywords in a description of the target fault and a respective text description of each historical fault, wherein the predefined keywords are classified into N different grades, and for each system component in a grade, the grade comprises at least one keyword for describing the system component, wherein N is an integer no less than 2;
   for each of the N different grades, counting a quantity of identical system components represented by the keywords in the grade in the text description of each historical fault and the keywords in the grade in the text description of the target fault, respectively; and
   comparing a degree of similarity of each historical fault to the target fault according to the quantity of identical system components counted in each grade of the N different grades, wherein a historical fault relating to a larger number of high-grade identical system components has a higher degree of similarity to the target fault.

2. The method as claimed in claim 1, further comprising obtaining the two historical faults from a fault case retrieval system.

3. The method as claimed in claim 1, wherein the method further comprises removing historical faults from the two historical faults if the number of identical system components related to the historical faults is 0 for each of the N different grades.

4. The method as claimed in claim 1, further comprising determining N based on a quantity of layers of the system composition of the target system related to the target fault, and the larger the number of layers of the system composition of the target system is, the larger N is.

5. A fault processing system comprising:
one or more processors in communication with a memory;
the memory storing a set of instructions;
the set of instructions causing one or more of the processors to function as:
a receiving module configured to receive two historical faults similar to a target fault;
a searching module configured to search predefined keywords in a text description of the target fault and a respective text description of each historical fault, wherein the predefined keywords are classified into N different grades, and for each system component in a grade, the grade comprises a keyword for describing the system component, wherein N is an integer no less than 2;
a counting module configured to count a quantity of identical system components represented by the keywords in the grade in the text description of each historical fault and the keywords in the grade in the text description of the target fault respectively for each of N different grades; and
a processing module configured to compare a degree of similarity of each historical fault to the target fault according to a number of identical system components counted in each grade of the N different grades, wherein a historical fault relating to a larger number of high-grade identical system components has a higher degree of similarity to the target fault.

6. The fault processing system as claimed in claim 5, further comprising a fault case retrieval system obtaining the two historical faults.

7. The fault processing system as claimed in claim 5, wherein the processing module is further configured to remove historical faults from the two historical faults if the number of identical system components related to the historical faults is 0 for each of the N different grades.

8. The fault processing system as claimed in claim 5, wherein N is determined by the number of layers of the system composition of the target system related to the target fault, and the larger the number of layers of the system composition of the target system is, the larger N is.

9. A fault processing system comprising:
a processor; and
a memory connected to the processor and storing computer-executable instructions;
wherein the computer-executable instructions direct the processor to:
receive two historical faults similar to a target fault;
search predefined keywords in the a description of the target fault and a respective text description of each historical fault, wherein the predefined keywords are classified into N different grades, and for each system component in a grade, the grade comprises at least one keyword for describing the system component, wherein N is an integer no less than 2;
for each of the N different grades, count a quantity of identical system components represented by the keywords in the grade in the text description of each historical fault and the keywords in the grade in the text description of the target fault, respectively; and
compare a degree of similarity of each historical fault to the target fault according to the quantity of identical system components counted in each grade of the N different grades, wherein a historical fault relating to a larger number of high-grade identical system components has a higher degree of similarity to the target fault.

* * * * *